United States Patent [19]

Onderka et al.

[11] Patent Number: 5,062,668
[45] Date of Patent: Nov. 5, 1991

[54] SAFETY LOCK FOR THE DOORS OF ELECTRICAL APPLICANCES

[75] Inventors: Oswald Onderka; Fritz Krasser, both of Altdorf, Fed. Rep. of Germany

[73] Assignee: Ellenberger & Poensgen GmbH, Altdorf, Fed. Rep. of Germany

[21] Appl. No.: 507,216

[22] Filed: Apr. 11, 1990

[30] Foreign Application Priority Data

Apr. 13, 1989 [DE] Fed. Rep. of Germany ....... 8904660

[51] Int. Cl.$^5$ ............................................. E05B 15/02
[52] U.S. Cl. .............................. 292/25; 292/DIG. 69; 292/45; 200/61.64
[58] Field of Search .................... 292/25, 45, DIG. 69, 292/70, 76, 78; 200/61.62, 61.64, 61.67, 61.68

[56] References Cited

U.S. PATENT DOCUMENTS

| | | | |
|---|---|---|---|
| 3,133,168 | 5/1964 | Jacobson | 200/61.68 |
| 3,617,957 | 11/1971 | Brighenti | 200/61.64 |
| 3,750,851 | 6/1969 | Perl | 200/61.68 |
| 3,892,933 | 7/1975 | Rocchitelli | 200/61.67 |
| 3,924,085 | 12/1975 | Stone | 200/61.68 |
| 4,032,180 | 6/1977 | Pohl | 292/DIG. 69 |
| 4,314,217 | 2/1982 | Krasser | 70/280 |
| 4,620,735 | 11/1986 | Heydner | 200/61.64 |
| 4,703,147 | 10/1987 | Happ et al. | 200/61.62 |
| 4,963,706 | 10/1990 | Mohtasham | 200/61.62 |
| 4,988,132 | 1/1991 | Rocchitelli | 292/DIG. 69 |

FOREIGN PATENT DOCUMENTS 699284 12/1964 Canada ............................. 200/61.64
181376 11/1962 Sweden ................................ 292/45

Primary Examiner—Eric K. Nicholson
Attorney, Agent, or Firm—Spencer & Frank

[57] ABSTRACT

A safety door lock for a door of an electrical appliance includes a longitudinally displaceable detent bolt mounted in a door of an appliance, a door lock housing having an opening receiving the free end of the detent bolt, and a longitudinally displaceable switching slide that having a stub end adapted to engage with the free end of the detent bolt. After engagement, further longitudinal displacement of the detent bolt causes movement of the switching slide to its "on" position. A biasing mechanism urges the switching slide toward an "off" position in which a detent mechanism latches the detent bolt in a locking position upon insertion of the detent bolt in the door lock housing. The detent mechanism includes a releasable locking latch which clamps the switching slide in the "on" position. The locking latch has a first portion which, in the "on" position of the switching slide, engages the detent bolt to retain the detent bolt within the door lock housing, and has a second portion which, in the "off" position of the switching slide, engages the switching slide to retain the switching slide against longitudinal movement toward the "on" position.

37 Claims, 10 Drawing Sheets

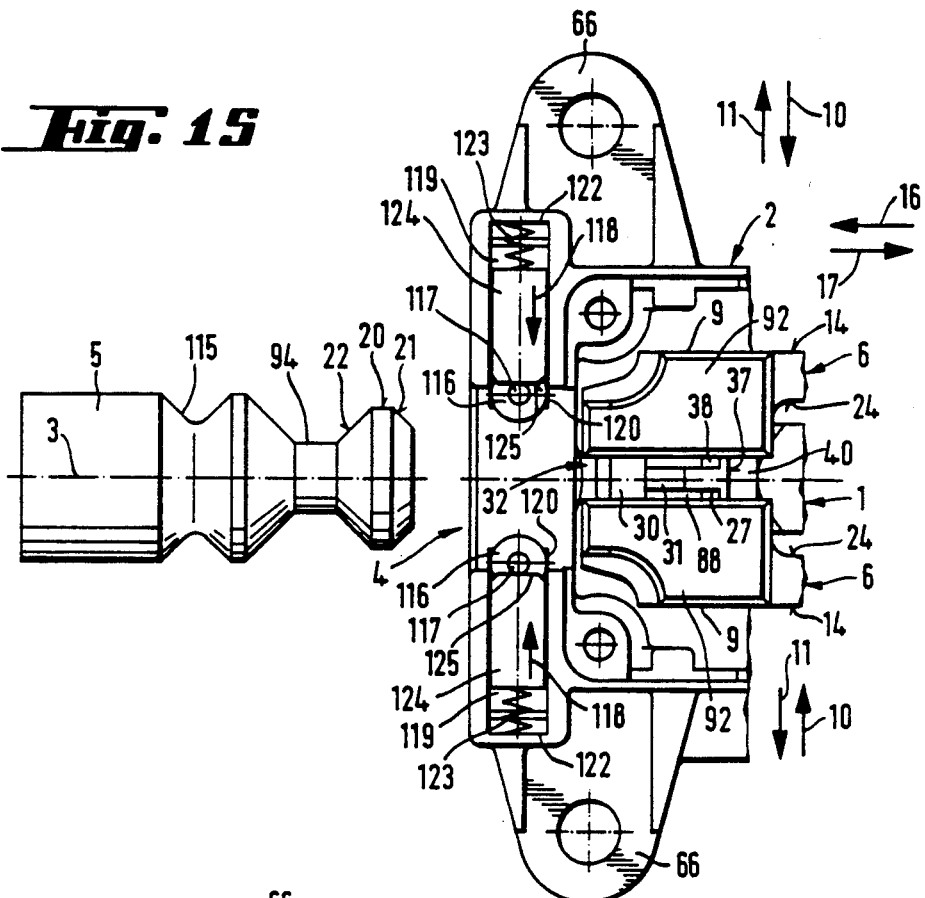
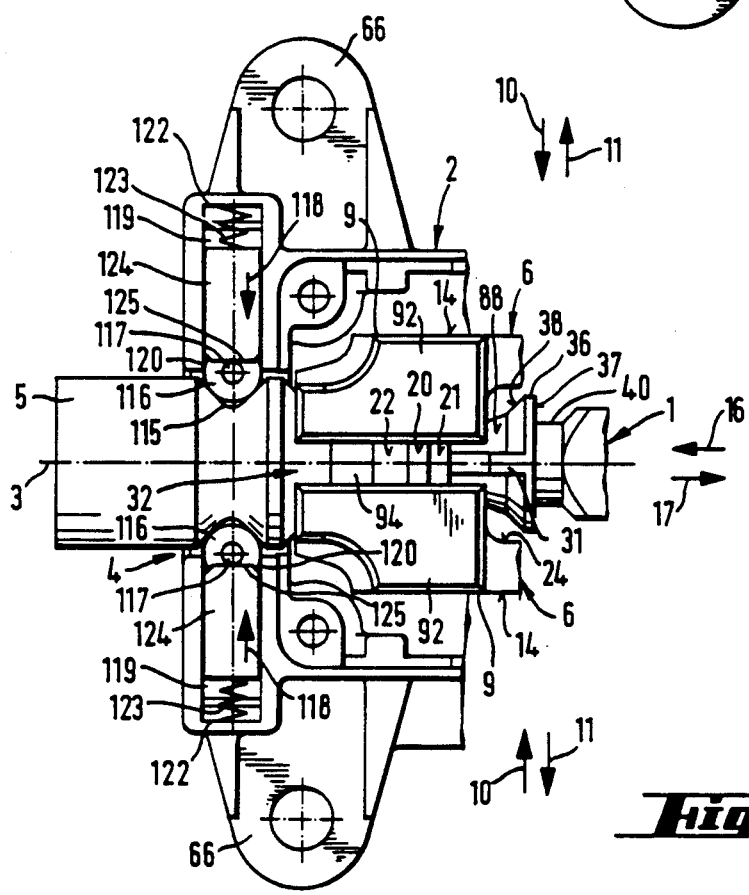

SAFETY LOCK FOR THE DOORS OF ELECTRICAL APPLICANCES

CROSS REFERENCE TO RELATED APPLICATION

This application claims the priority of Application Ser. No. G 89 04 660.9, filed Apr. 13, 1989, in the Federal Republic of Germany, the subject matter of which is incorporated herein by reference.

BACKGROUND OF THE INVENTION

The present invention relates to a safety lock for the doors of electrical appliances, particularly electrical ranges, including the features defined in the preamble of claim 1. Such door locks serve, on the one hand, to reliably hold the door in the locked position and permit the operator to manually open the door only if the electrical appliance is in a non-dangerous operating state. For this purpose, the detent bolt actuates a switching element when the door is closed which, as soon as the door is securely locked, enables the circuitry within the appliance to be actuated. There is a general desire to make such door locks as secure against manipulation, as strong and as operationally reliable as possible.

In the door lock disclosed in U.S. Pat. No. 4,703,147, the side of the door is equipped with two pivotal detent levers whose actuating ends, in the closed state, each engage behind a shielding projection at the door lock housing and thus each actuate a switching slide displaceably mounted in the lock housing. The circuits to be actuated in the appliance are not enabled until after these switching slides have reached their final displacement position. In this prior art door lock, the shielding projections serve only as a viewing block so as to hide the actuating ends of the two switching slides from view. This safety measure can easily be outsmarted in that the two switching slides are moved into their "on" position, for example by means of wires or the like which are bent in the manner of hooks and grip behind the shielding projections.

SUMMARY OF THE INVENTION

It is an object of the present invention to provide a safety door lock of the above-mentioned type which, in spite of its simple construction, reliably performs the most varied safety functions and also substantially withstands safety endangering manipulations. This is accomplished initially by the characterizing features of claim 1.

The structure according to the present invention operates with only one switching slide which is displaceable only linearly within the lock housing by directly displacing a detent bolt which is also provided only for linear displacement. Moreover, if the door lock is open, several detent latch carriers lock the switching slide in its "off" position. Before the switching slide can be pushed into its "on" position, against the force of a spring which charges it in the direction of its "off" position, which is a prerequisite for current to flow into the electrical appliance, these detent latch carriers must be moved apart in different directions. To accomplish this, a total of at least three pressure components in three different directions must act on three different door lock elements, which is practically impossible for an operator equipped with only two hands.

The teaching of claim 2 provides for mounting of the latch carriers in a particularly simple and safe manner within the housing. Only slight spring forces are required to automatically lock the respective switching slide in its "off" position, i.e. the door opening position. As will become evident from the further features disclosed in the dependent claims, the latch levers, in their locking position, extend approximately parallel to the switching slide so that even strong external manipulatory forces acting on the switching slide in the "on" direction, due to the absence of lever arms, are caught and absorbed by the latch levers.

Although, when the electrical appliance is turned on, the detent bolt of the door lock is secured against inadvertent opening of the door by way of a somewhat double-action spring biased pawl and ratchet assembly, it is normally possible for the operator to open the door, namely if the operating state of the electrical appliance does not endanger the operator when the door is opened.

However, special safety measures are required in connection with modern electrical ranges employing microwaves or a pyrolysis function. In the latter case, for example, the oven walls are heated to about 500° C. In such an operating state it must be ensured that opening of the door is reliably impossible. Door opening should be possible only after a certain cooling state has been attained. This is accomplished by the characterizing feature of claim 4. Activation and, after re-establishment of a non-dangerous operational state of the electrical appliance, the inactivation of the blocking member are accomplished by an electrical program control in the appliance.

The feature of claim 5 permits a space saving flat configuration of the door lock without making it less secure against manipulation. Both latch levers would first have to be moved in different directions, that is, by means of two different manipulation devices, into their release position and would have to be held there before the switching slide could be pushed externally into a third direction, namely the "on" direction in order to supply current to the appliance.

The teaching of claim 6 is based on the already mentioned fact that, during the interaction of the door-side detent bolt with the detent latches, the longitudinal movement of the detent bolt is converted into a transversal movement of the latch carrier. Due to the configuration of these latch carriers as unilaterally pivotally mounted latch levers which act in the manner of a vise, the pressure components acting on the detent latches in the "on" direction are reliably caught without causing wear. This is also enhanced by the extremely slight angular movements at the bearing end of the latch levers during their pivoting between the detent position and the release position so that there will be no noticeable wear of the bearing.

The feature of claim 8 ensures a particularly simple and effective resetting of the latch levers with favorable leverage conditions. The features defined in claims 9 to 11 signify a structurally simple solution which is easily realized from a manufacturing point of view for coupling the closing and opening process for the door with a control of the latch lever movements. The control faces of the detent latches and the opposing faces at the detent bolt or switching slide acting on these control faces cooperate in the sense of a wedge gear which again enhances operational reliability.

The features of claims 12 and 13 permit the wedge faces to have a large-area configuration with a corresponding reduction of their specific loads per unit of surface area, for example when the door of the electrical appliance is slammed shut. The cooperating conical faces at the detent latches here cause the detent bolt to be centered and the uniform pressure stress exerted by the locking latches of the latch levers on both sides of the switching slide result in minimization of bearing pressures exerted by the switching slide and to be absorbed by the insulated housing. The feature of claim 14 increases security against manipulation in that the pin and the radial webs of the switching slide, when the door is open and thus the detent bolt has been removed, fill the space between the detent latches and thus also prevent the insertion of a foreign object into the door lock.

The configuration of the switching slide as defined in claims 16 to 18 causes the lock latches to ensure, if the door is open, that the switching slide is latched in its "off" position. On the other hand, the flanks of the lock latches on their opening sides, which act in the manner of wedge faces, cause the switching slide to automatically spread apart the latch levers under the pressure of the return spring which permanently acts on it and to establish the locked off-state without this requiring an electrical drive. This capability is of significance also for the case that the mains voltage of the electrical appliance should be off for a short period of time. The configuration according to claim 18 has the effect that, in an attempt to forcibly move the switching slide against its lock into the "on" direction, the specific load per unit of surface area on the abutment faces and thus the danger of the locking latches breaking off is minimized. The further claim features define the configuration of the blocking device which is designed to be particularly space saving. If an attempt is made to forcibly open the door with the detent bolt lock locked, the spreading forces acting on the latch levers are easily caught and absorbed by the tabs of the pivotal member under merely a bending stress for the tabs. However, the bearing of the pivotal member remains practically unstressed which, in turn, has a favorable influence on the service life and operational reliability of the blocking device.

The measure defined in claim 21 ensures that during a forcible attempt at opening, the spreading pressures exerted on the latch levers are transmitted to the tabs of the pivotal member without any translatory lever action.

The drive mechanism for the pivotal member as defined in claims 23 and 24 has the advantage that the electromagnetic drive acts in only one direction and the driving tappet need not be mounted in an articulated manner. The features of claims 26 to 28 provide that the installed position of the door lock plays no significant role in the operational reliability of the blocking device and its driving members. Due to the feature of claim 30, the electromagnetic drive need be designed only for short-term operation.

The features of claims 32 to 36 facilitate the adjustment work required when the door is attached to the appliance. The appliance door must be installed in the appliance in such a manner that, on the one hand, it lies flush against the appliance when in the closed position but nevertheless the detent bolt enters into the insulated housing of the door lock only to a depth defined by the switching path of the switching slide. In this connection, it must be considered that the door lock, once it has been installed in the appliance, is disposed at a location which is no longer accessible from the outside. Changes in the space between door lock housing and appliance door as a result of manufacturing tolerances are no longer possible. The spring driven pawl and ratchet assembly according to the invention which acts relative to the detent bolt holds the detent bolt automatically at its desired penetration depth in the door lock housing so that its subsequent fixation to the appliance door and its adjustment can be performed quickly and reliably in the correct position. Moreover, this double-action spring driven pawl and ratchet assembly constitutes a further gain in locking force for the door under normal operation of the appliance.

The measure according to claim 37 ensures that the engagement of the detent rollers in the detent groove takes place within a narrowly defined range of motion of the detent bolt. The reliability of the mount is here increased. Locating the engagement point for adjustment work is facilitated, particularly since it is possible to locate it merely by touch and sound with the door almost closed.

BRIEF DESCRIPTION OF THE DRAWING FIGURES

The invention will be described in greater detail with reference to an embodiment illustrated in the drawing figures.

FIGS. 15 to 17 depict a modified embodiment of the door lock housing and of the detent bolt for facilitating the adjustment of the door lock during installation.

DETAILED DESCRIPTION OF THE PREFERRED EMBODIMENT

Figure 1:
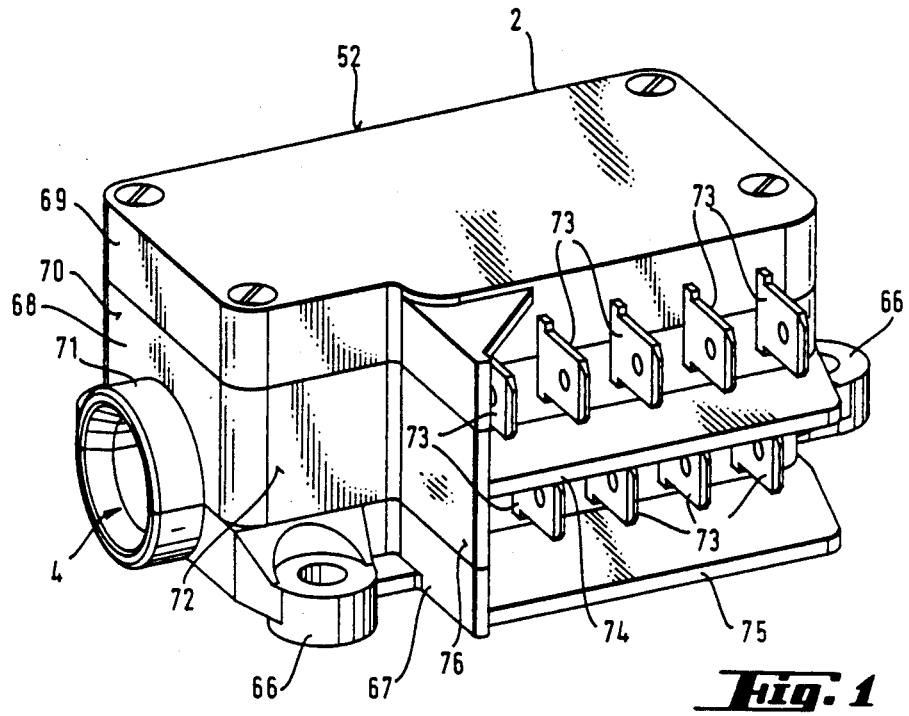
FIG. 1 is a perspective exterior view of a safety door lock.

The door lock housing 2 composed of insulating material includes a bottom shell 67 having integral fastening flanges 66, a center section 68 and a covering shell 69. The housing 2 has the outline of a block. Its opening or narrow side wall 70 at its end face is provided with a housing opening 4 surrounded by an annular collar 71. Along the separating groove between covering shell 69 and the center section 68 and along the separating groove between bottom shell 67 and the center section 68, two rows of connecting lugs 73 for electrical terminals project parallel to and above one another from the frontal longitudinal side wall 72. On the exterior side of the housing 2, the two rows of connecting lugs 73 are shielded from one another by a partition 74, from the bottom side by a partition 75 and from the narrow side wall 70 by a partition 76. In the installed position of the door lock, these sides are the exterior sides of the lock.

Initially, the components of the closing and latching device of the door lock disposed in the door lock housing 2 between the center section 68 and the bottom shell 67 will be described with reference to FIGS. 2 to 6. Their central component is a switching slide 1 whose longitudinal center axis 3 extends in the longitudinal direction of the bottom shell 67 which has an essentially rectangular outline. The switching slide 1 is seated within two guides 77 and is shaped such that it is longitudinally linearly displaceable in the direction of its longitudinal center axis 3 relative to the bottom shell 67 and the center section 68. A compression spring 78 having two projections 53 is placed between the end face of the switching slide 1 and the facing housing wall. An arrow 17 indicates an "on" direction of movement of the switching slide 1, and an arrow 16 indicates an "off" direction of the switching slide 1. The compression spring 78 urges the two projections 53, disposed at the bottom and top of the switching slide 1, against abutments 79 fixed to the housing 2 at the bottom shell 67 and at the center section 68. In the position where these projections 53 are in contact with the abutments 79, the switching slide 1 has reached its "off" position.

In its central section, the switching slide 1 is provided with two rectangular recesses 80, 80'. Each one of these recesses accommodates a contact bridge 81, 81' and a compression spring 82, 82' which charges contact bridges 81, 81' in the "on" direction and urges them against the narrow side walls of the switching slide recesses 80, 80'. Each contact bridge 81, 81' coupled for movement with the switching slide 1 has an associated pair of contact members 83, 84 and 83', 84', respectively, which are fixed to the housing 2. Contact members 83, 84 and 83', 84' flank and cross the switching slide 1 on both sides at a right angle to its longitudinal axis 3, with one contact member 83, 83' of a pair of contact members being disposed above the switching slide 1 and the other contact member 84, 84' of the pair below it. As opposing contacts fixed to the housing 2 for contact bridges 81, 81' which are coupled for movement with the switching slide 1, contact members 83, 84 and 83', 84' are each provided with fixed contacts 85.

The end 27 of the switching slide 1 oriented in the "off" direction 16 has a head-shaped thickened portion. This portion includes a cone frustum 88 which tapers in the "off" direction 16 and the head-shaped portion has a stub 30 at its tapered end. At its end oriented in "on" direction 17, the head has an annular circumferential, radially oriented detent projection 36 having a detent abutment face 37 which has a sawtooth-shaped cross section. For action, the detent abutment face 37 extends at a right angle to the center longitudinal axis 3 and is oriented in the "on" direction. The detent projection 36 has a wedge face 38 oriented in the "off" direction 16. Moreover, two diametrically oppositely disposed radial webs 31 project from the cone frustum 88.

Figure 5:
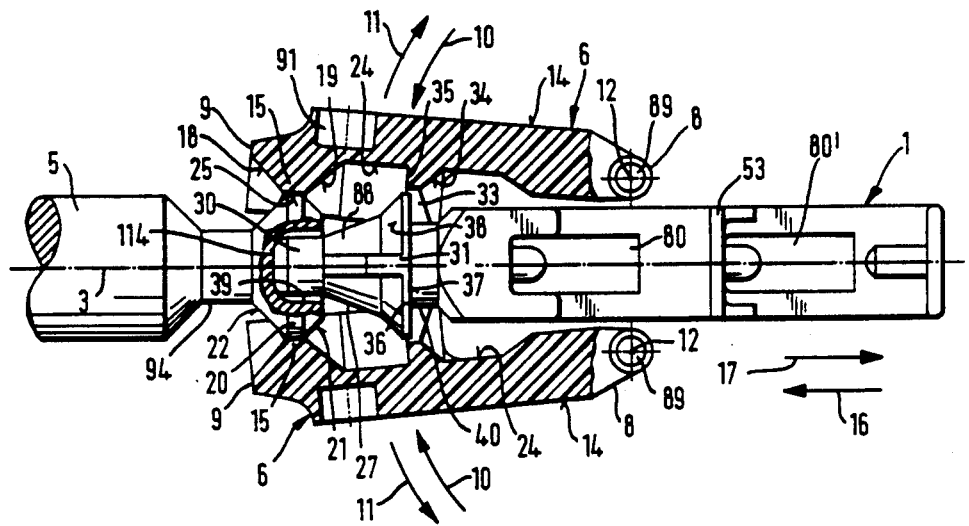
FIG. 5 is a schematic representation of the detent bolt which has been pushed into its locking position, spreading apart the latch levers.
Figure 6:
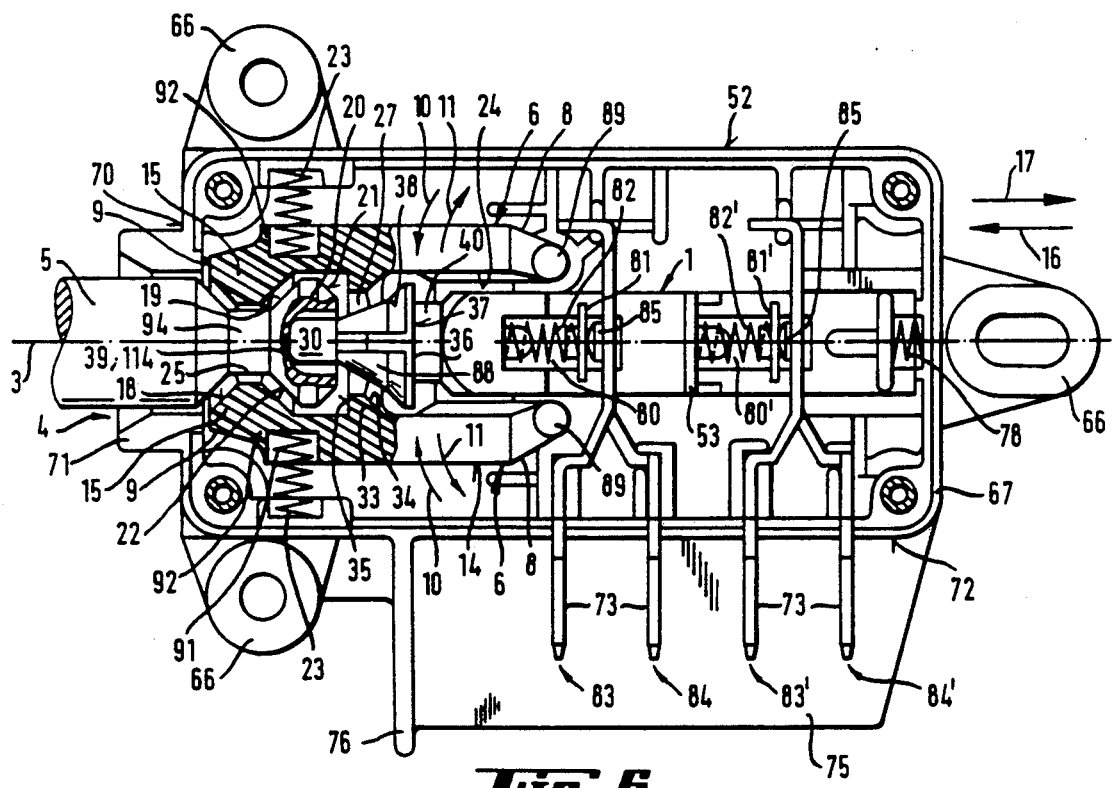
FIG. 6 is a top view of the operational components that are significant for the locking of the door lock, with the switching slide pushed into the "on" position.

In the half of the bottom shell 67 adjacent the housing opening 4, two latch levers 6 are mounted at diametrically opposite sides of the switching slide 1 and parallel to its center longitudinal axis 3. Their free ends 9 can be pivoted outwardly parallel to the surface of the bottom shell 67 in a direction away from the switching slide 1. In their pivoted-in rest position, they serve to lock the switching slide 1 in its off position, for example, if the door is open. Moreover, if the door is closed, they serve to fix a detent bolt 5 from the door which is inserted into the housing opening 4 when the door is locked (FIGS. 5, 6). The ends 8 of the latch levers 6 oriented in the "on" direction 17 are pivotally mounted by means of integral pins 89 in housing eyes 90 of the bottom shell 67 and the center section 68. The pivot axes 12 of the latch levers 6 extend at a right angle to the longitudinal center axis 3 of the switching slide 1.

In the region of their free ends 9, the latch levers 6 are each charged by a compression spring 23 into their detent or rest position, that is, in a detent direction which is indicated by an arrow 10. The compression springs 23 are inserted into blind bores 91 on the exterior faces 14 of detent latch levers 6 facing away from the switching slide 1 and are supported at the housing 2. In the region of their free ends 9, detent latch levers 6 are configured as trough-shaped half-shells 92 whose interior faces 24 facing the switching slide 1 are curved concavely with the longitudinal direction of the trough oriented parallel to the longitudinal center axis 3. They enclose the head region, including end 27, of the switching slide 1.

Each one of the two half shells 92 has a detent latch 15 which has a wedge-shaped cross section, on the one hand, for use in controlling the operational movements of the half shells 92 and, on the other hand, for latching the detent bolt 5 which is introduced through the housing opening 4. The detent latch 15 is disposed at the free end 9 of the latch levers 6. The two latch levers 6 further include, between their free ends 9 and their bearing ends 8, a locking latch 33 having a sawtooth-shaped cross section for fixing the switching slide 1 in its "off" position. Both latches 15 and 33 project radially inwardly from the trough-shaped concave interior faces 24 of the half shells 92 in the detent direction indicated by the arrow 10 and have the shape of semi-annular beads.

Figure 2:
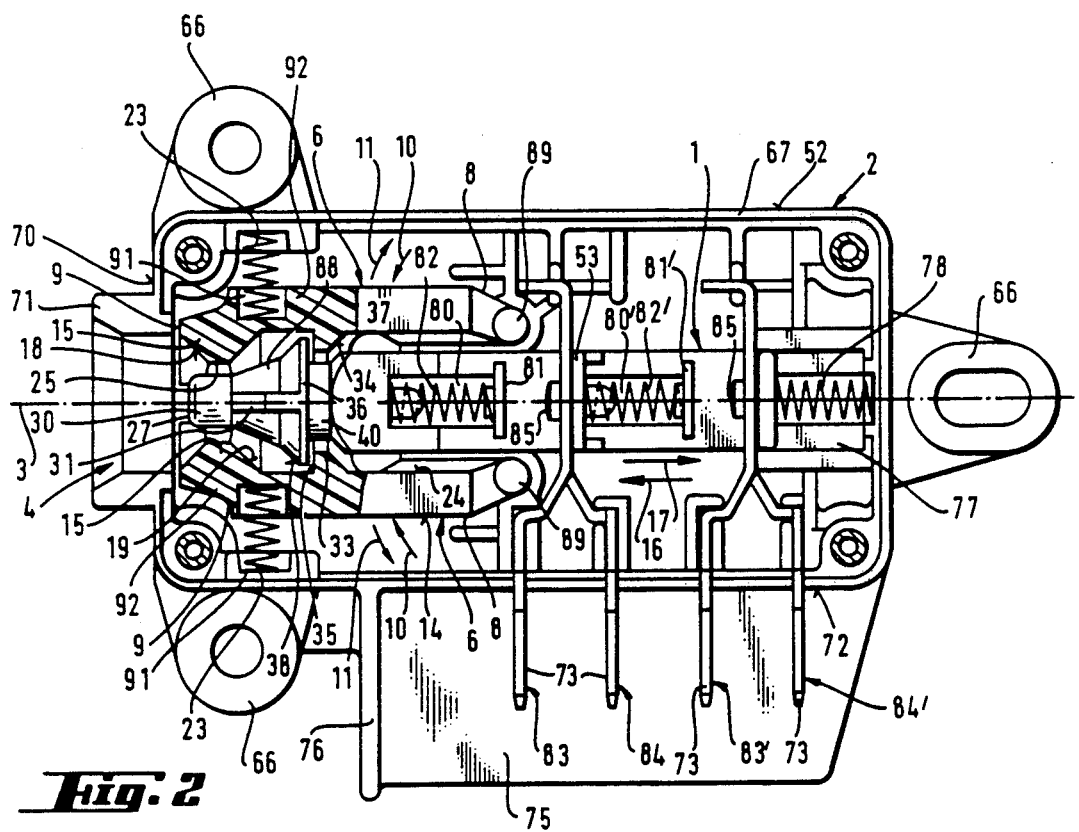
FIG. 2 is a top view of the door lock with the center section taken off, the switching slide in the "off" position and the latch lever in the position in which it locks the switching slide.
Figure 3:
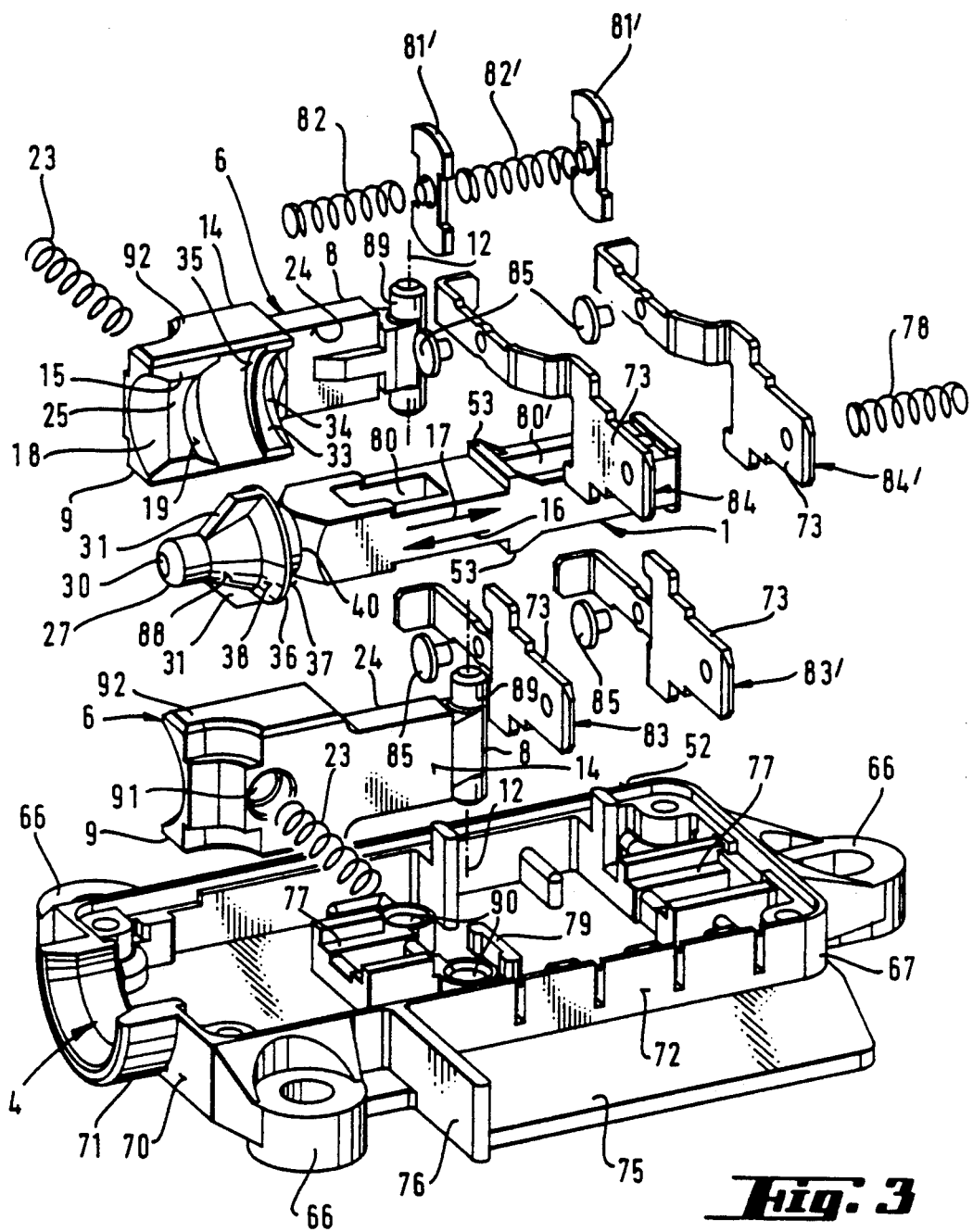
FIG. 3 is a perspective exploded view of the operational components significant for locking the door lock, with the center housing section lifted away from the bottom section.
Figure 4:
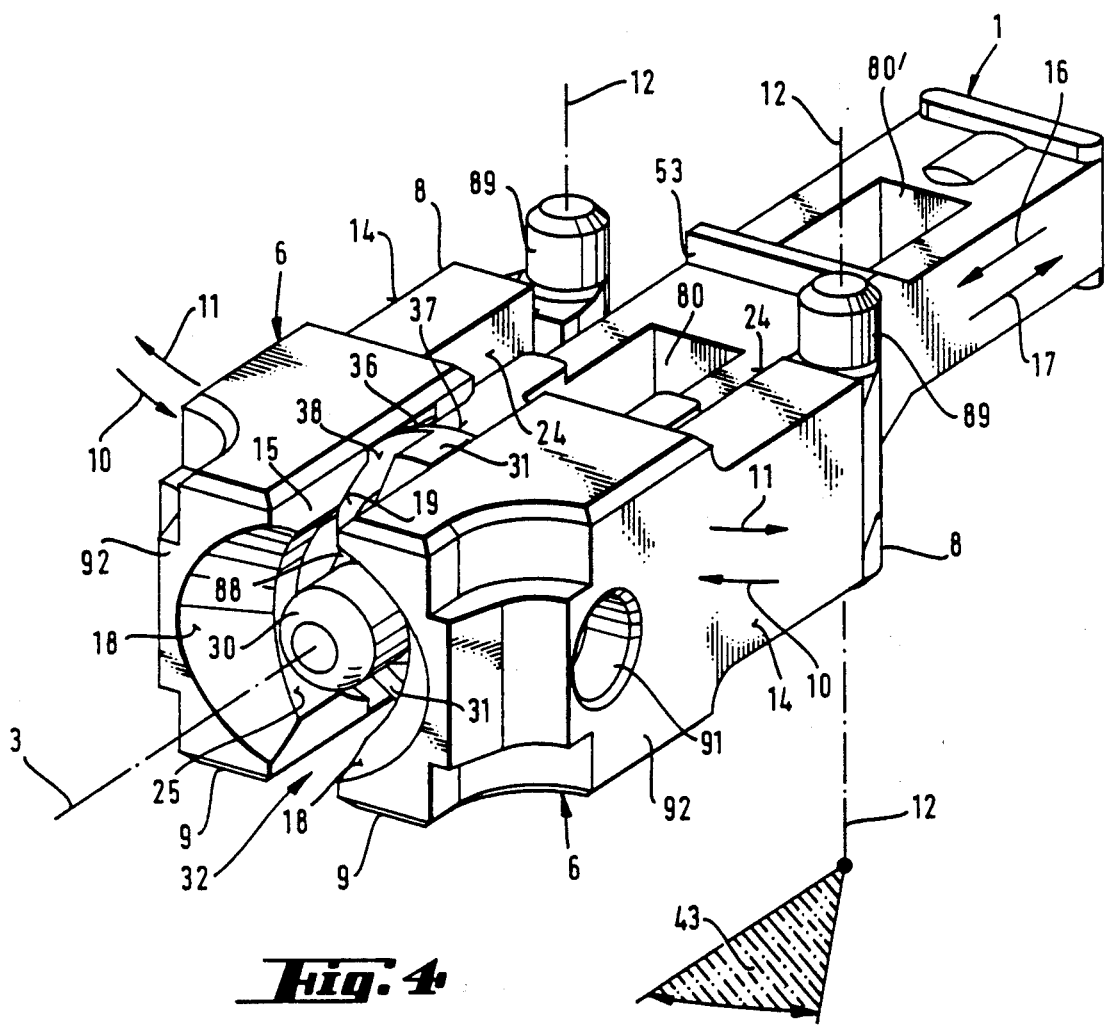
FIG. 4 is a perspective detail view of the switching slide and of the two detent latch levers cooperating with it.

The detent latches 15 on the side of the opening include a semi-conical wedge face 18 oriented in the "off" direction 16 and a likewise semi-conical wedge face 19 oriented in the "on" direction 17. If the door is in the open position, the semi-annular faces 25 of the latches disposed therebetween enclose, in the manner of an annular orifice, the stub end 30 of the switching slide 1, as shown in FIG. 2. The locking latches 33 lie between the detent latches 15 and the pivot pins 89 of the latch levers 6. They have a planar contact face 35 oriented at a right angle to the longitudinal center axis 3 in the "off" direction 16 and a wedge face 34 oriented in the "on" direction 17. The inclination angles of the wedge faces 18 and 19 of latches 15 and those of the wedge faces 34 of the locking latches 33 facing away from the housing opening 4 are about 45°.

As shown in FIG. 5, the detent bolt 5 on the door side has a stub shape. At its end toward the housing it tapers into a section 94 having a smaller diameter to which is shaped, at the end to be introduced into the housing opening 4, a head-like, circumferential annular projection 20 to control the movement of the latch lever 6 and latch detent bolt 5. The annular projection 20 includes an outer cone face 21 oriented in the "on" direction 17 and cooperating with the wedge face 18 of the latch levers 6 and an inner cone face 22 oriented in the "off" direction 16 and cooperating with the wedge face 19 of the latch levers 6. At the end face, the detent bolt 5 has a blind bore-shaped recess 39 for insertion of the stub 30 of the switching slide 1. In this mutual insertion position, the switching slide 1 is brought into its "on" position, shown in FIG. 6, when the detent bolt 5 is closed.

Figure 7:
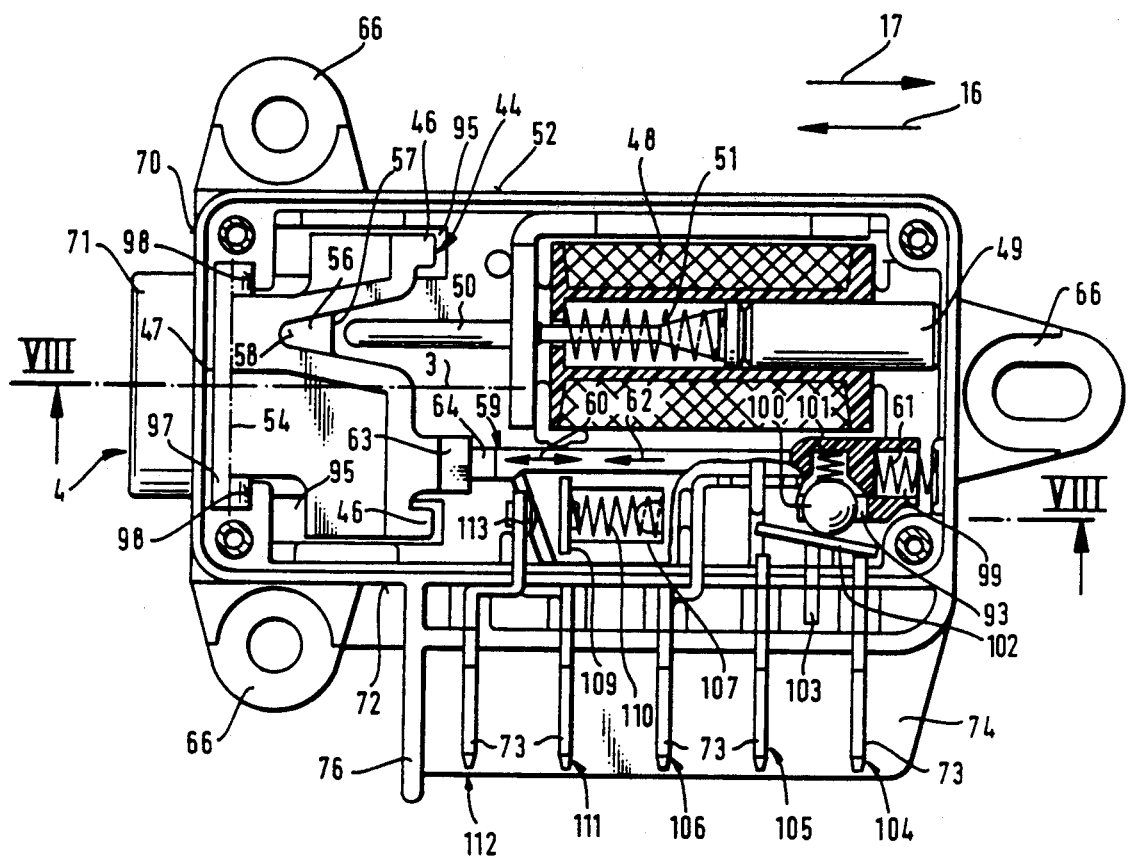
FIG. 7 is a top view of the blocking device accommodated in a side chamber of the insulated housing, with the blocking member in its inactive position.

The blocking device will be described in greater detail with reference to FIGS. 7 to 11. The blocking device serves to block the latch levers 6 in their detent position. It is accommodated between the center section 68 and the covering shell 69 of the insulated housing 2. FIG. 7 provides a view into the interior of the blocking device with the covering shell 69 removed. The core of the blocking device is the blocking member in the form of a pivotal member 44 which can be pivoted in the directions indicated by the double-headed arrow 45, between an inactive pivoted-out position in which the latch levers 6 are released and an active pivoted-in or blocking position in which the latch levers 6 are blocked. The pivotal member 44 has tabs 46 which are shaped to its lateral flanks and with which it passes, in its blocked position, through recesses 95 in the intermediate bottom 96 of the center section 68 to grip blockingly around the latch levers 6 in the manner of a clamp.

The end 47 of the pivotal member 44, which is oriented in the "off" direction 16 of the switching slide 1, has an integral stub 97 which is pivotally mounted in recesses 98 in the center housing section 68 and borders against the narrow side wall 70. The pivot axis 54 of the pivotal member 44 extends parallel to the pivot plane 43 of the latch levers 6 and at a right angle to the longitudinal center axis 3 of the switching slide 1. In order to pivotally drive the pivotal member 44, an electromagnetic step-by-step driving device is disposed on the longitudinal side wall 52 disposed opposite the longitudinal side wall 72. This driving device is composed of a coil 48, an armature 49, a driving tappet 50 for charging the pivotal member 44, and a reset spring 51 for driving the tappet 50. The driving tappet 50 selectively charges two fillets 55 and 56 of the pivotal member 44 as its abutment, with the pivotal member 44 being pivotal into its inactive pivoted-out position by the charging of its outer fillet 56, and into its active blocking position by the charging of its inner fillet 55 which is disposed on the side of the switching slide 1. The fillets 55 and 56 are separated from one another by a wedge-shaped web 57. The wedge faces 58 and 58' of the web 57 direct the driving tappet 50, which is configured as a tip tappet, alternatingly into the respective fillets 55 and 56, as the driving tappet 50 is moved toward the pivoted end of the pivotal member 44.

Adjacent the longitudinal side wall 72, there is disposed a locking slide 59 for fixing the pivotal member 44 in its inactive pivoted-out position or in its active blocking position. The locking slide 59 has a displacement direction indicated by an arrow 60 which extends at a right angle to the pivot axis 54 of the pivotal member 44 and which is parallel to the pivot plane 43 of the latch lever 6. In a blind bore-shaped recess 99 on the end face of the locking slide 59 facing away from the pivotal member 44, a compression spring 61 is seated which is supported at the housing wall and charges the locking slide 59 in a fixing direction indicated by an arrow 62. The end face of the locking slide 59 facing the pivotal member 44 is configured to act as a wedge in the fixing direction 62. It thus forms an outer control edge 64 projecting in the direction toward the pivotal member 44 and a set-back inner control edge 65. The two control edges 64 and 65 alternatingly charge a wedge-shaped cam 63 formed on the pivotal member 44.

In its region adjacent compression spring 61, on its side facing the longitudinal side wall 72, the locking slide 59 has an eye 93 into which are inserted a sphere 100 and a spring 101 charging it. Compression spring 101 urges sphere 100 against a rocker switch 102. Rocker switch 102 is mounted on a tilt web 103 which is fixed to the housing 2 and is electrically conductively connected with one end of the coil 48. Rocker switch 102 serves to alternatingly connect two contact members 104 and 105, flanking the tilt web 103, with the tilt web 103 and thus the with coil 48.

A third contact member 106 spaced from the contact member 105 in the fixing direction 62 is electrically conductively connected with the other end of coil 48. The part of the locking slide 59 adjacent the pivotal member 44 has a rectangular recess 107 into which is inserted, in a manner coupled for movement with the locking slide 59, a contact bridge 109 and a spring 110 which charges the contact bridge 109 in the fixing direction 62. The contact bridge 109 has two associated contact members 111, 112 which are each fixed to the housing 2 and each have a fixed contact 113 for contact with contact bridge 109. The connecting lugs 73 of contact members 104, 105, 106, 111 and 112, which are all fixed to the housing 2, project at a right angle from the longitudinal side wall 72 of the center housing section 68.

Figure 17:
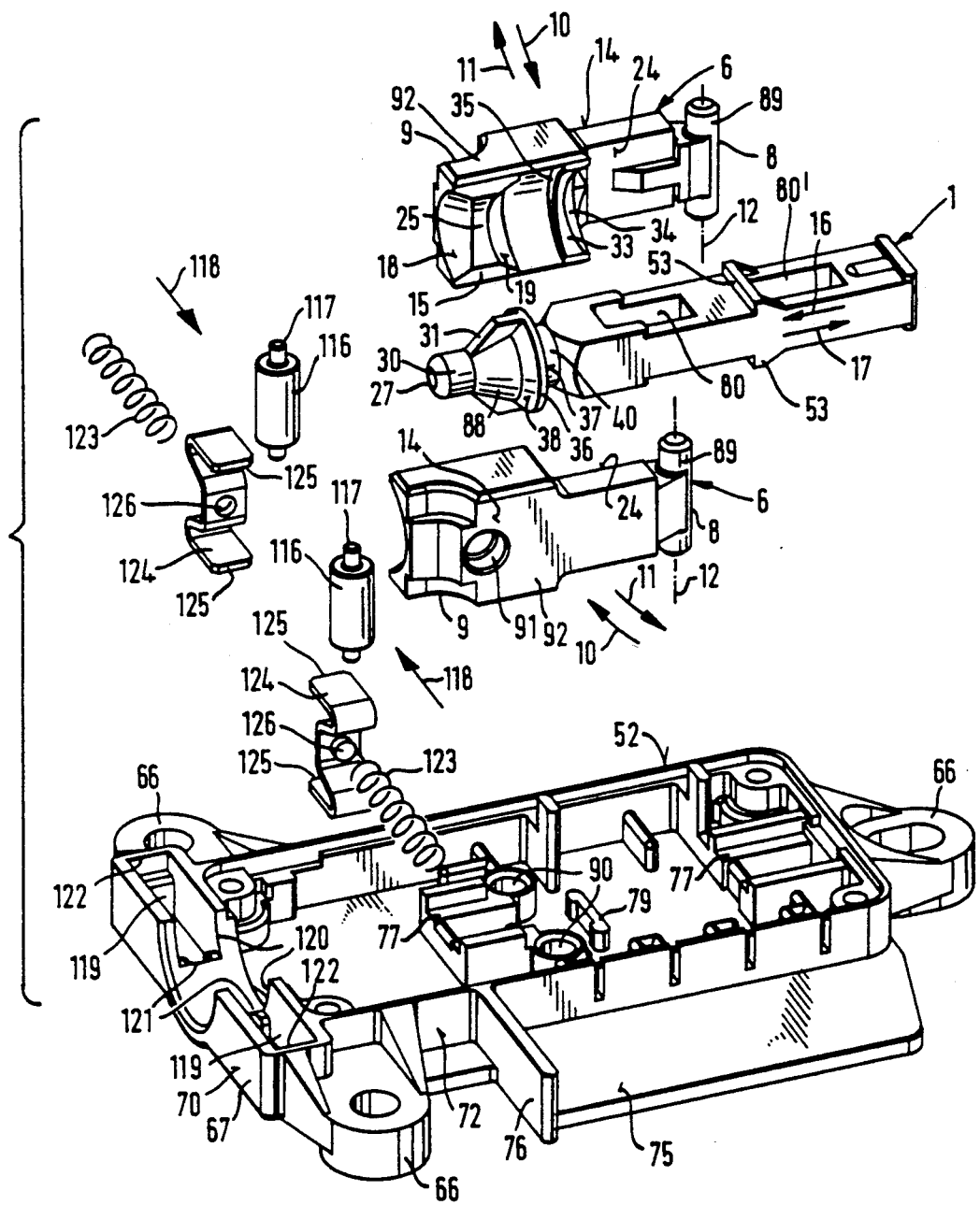

The detent adjustment device is shown in FIGS. 15 to 17. It includes, as a catch, two detent rollers 116 which are disposed at diametrically opposite sides of the housing opening 4 and project into the path of movement of the detent bolt 5 on the side of the door. Pivot pins 117 of a smaller diameter are shaped to the end faces of detent rollers 116. With the door closed, detent rollers 116 which are spring biased in the detent direction engage in a detent groove 115 which has an approximately V-shaped cross section and is provided at the door-side detent element 5. Detent groove 115 has such dimensions that it accommodates about half the cross-sectional area of detent rollers 116. Detent rollers 116 are arranged parallel to one another and at a right angle to the longitudinal axis of the switching slide 1 and are movable in guide channels 119 which extend on both sides from the housing opening into the interior of the insulated housing 2 where they end blindly. Guide channels 119 have an approximately rectangular cross section and, at the opening end 120 facing the housing opening 4, they each have two stops 121. The pivot pins 117 of detent rollers 116 lie against these stops 121 in such a manner that part of the circumferential face of detent rollers 116 projects into the housing opening 4.

A compression spring 123 is inserted into each one of guide channels 119 and is supported at the blind end 122 of guide channels 119. Between compression spring 123 and detent roller 116 there is inserted an essentially U-shaped bearing shackle 124. It is charged by compression spring 123 in detent direction 118, and the end faces 125 of both its arms are supported against the circumferential face of pivot pins 117. On the side of the center section of U-shaped bearing shackle 124 facing toward compression spring 123, an arresting stub 126 is shaped for compression spring 123.

The operation and function of the door lock will now be described as follows:

FIG. 2 shows the open door lock with the appliance door open and with the appliance in the "off" position. Compression spring 78 urges the projections 53 of the switching slide 1 in the "off" direction 16 against abutments 79 at lower shell 67 and at the center section 68. In this position, contact bridges 81 and 81' do not contact their opposing fixed contacts 85 so that the circuits connected with contact member pairs 83, 84 and 83', 84' in the appliance are interrupted. The electrical appliance can thus not be turned on. The latch levers 6 charged by compression springs 23 are in their locking and detent position, respectively, in which they fix the switching slide 1 in the "off" position. An attempt to slide the switching slide 1 in the "on" direction 17 by means of an object introduced into the housing opening 4 would fail since its locking projections 36 are arrested in that the abutment faces 35 of the locking latches 33 engage behind them.

The stub of the switching slide 1 lying between detent latches 15 prevents both the latch levers 6 from being gripped simultaneously and moved radially outwardly into their release position by means of a broader object, for example a stub-shaped object inserted centrally into the housing opening 4. If, for example, a screwdriver is introduced eccentrically into the housing opening 4 and into the separating groove 32 between the latch levers 6, in order to spread apart the latch levers 6, this object encounters resistance from the radial webs 31 shaped to the head end of the switching slide 1. Further penetration is thus prevented.

The switching slide 1 is pushed into its release position only by closing of the door and the connected introduction of the detent bolt 5 into the door lock. The conical face 21 of the detent bolt 5 here initially abuts on the wedge faces 18, facing in the "off" direction 16, of detent latches 15 of the latch levers 6, thus spreading apart the latch levers 6 in the release direction 11 and moving them into their released position. FIG. 5 shows an intermediate position in which the detent bolt 5 holds the latch levers 6 in their release position and the bottom 114 of its blind-bore shaped recess 39 charges the stub 30 of the switching slide 1 to be driven for displacement in the "on" direction 17, i.e., toward its "on" position.

Further closing of the appliance door and the further introduction of the detent bolt 5 into the door lock connected therewith, causes the switching slide 1 to be pushed against the pressure of compression spring 78 into its "on" position and, driven by the inwardly oriented compression springs 23, the latch levers 6 return to their rest position. The wedge faces 19 of the detent latches 15 of the latch levers 6 oriented in the "on" direction 17, now press onto the inner conical face 22 of the annular projection 20 of the detent bolt 5 and charge the latter in the manner of the catch of a spring driven pawl and ratchet assembly with a force component which holds the appliance door in its closed position. In the "on" position of the switching slide 1, fixed contacts 85 are bridged to contact member pairs 83, 84 and 83', 84' by means of contact bridges 81 and 81'. The circuits connected with contact member pairs 83, 84 and 83', 84' are now closed and the appliance may be operated as selected.

By opening the door of the appliance at the end of its functions, the latch levers 6 are moved radially outwardly into their release position since the inner cone face 22 of its detent bolt 5 has moved onto the wedge faces 19 of detent latches 15 oriented in the "on" direction. The switching slide 1 is thus released and compression spring 78 moves it automatically into its "off" direction 16 without it being possible to prevent this displacement movement.

If it should be possible, by way of skilled manipulation, to push the switching slide 1 into its "on" position, the latter does not remain there but is mechanically and automatically pushed back into its "off" position 16 by the compression spring 78. During this movement, the wedge face 38 of the detent projection 36 of the switching slide 1 pushes against the wedge faces 34 of the locking latches 33 which face in the "on" direction 17. The latch levers 6 are thus spread apart and the switching slide 1 returns to its "off" position. It is held in this position by the lock stop faces 35 of the locking latches 33 passing behind the abutment faces 37 of the switching slide 1.

Figure 8:
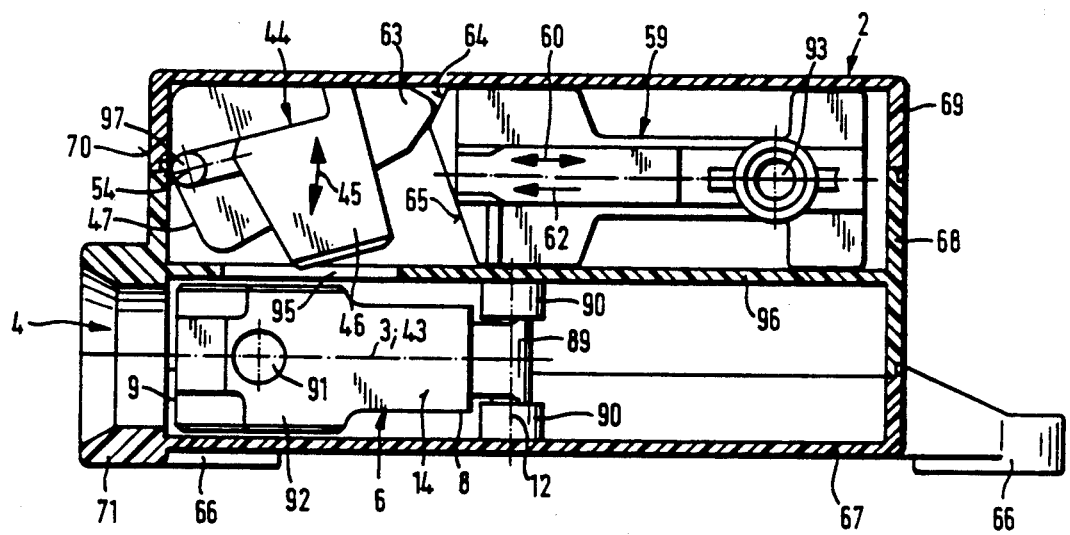
FIG. 8 is a sectional view seen along line VIII—VIII of FIG. 7.
Figure 9:
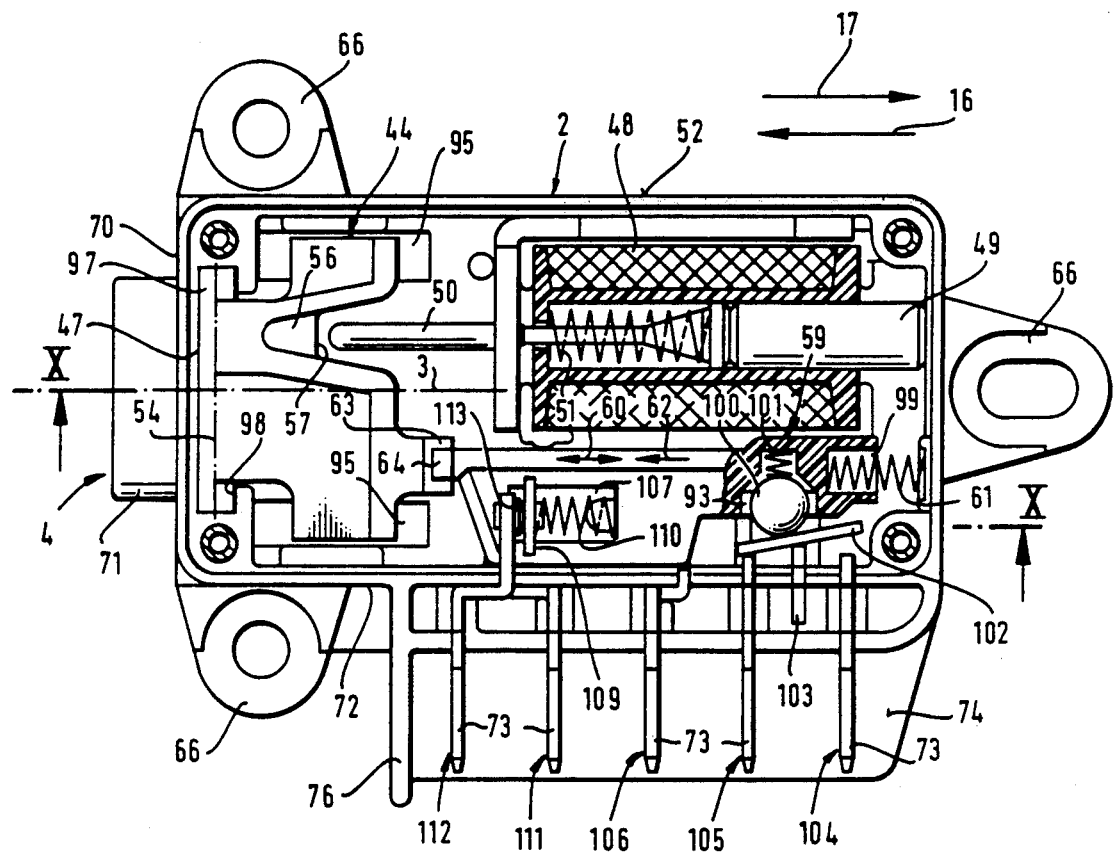
FIG. 9 is a top view of the blocking device analogous to FIG. 7, but with the blocking member in its active, that is, its blocking position.
Figure 10:
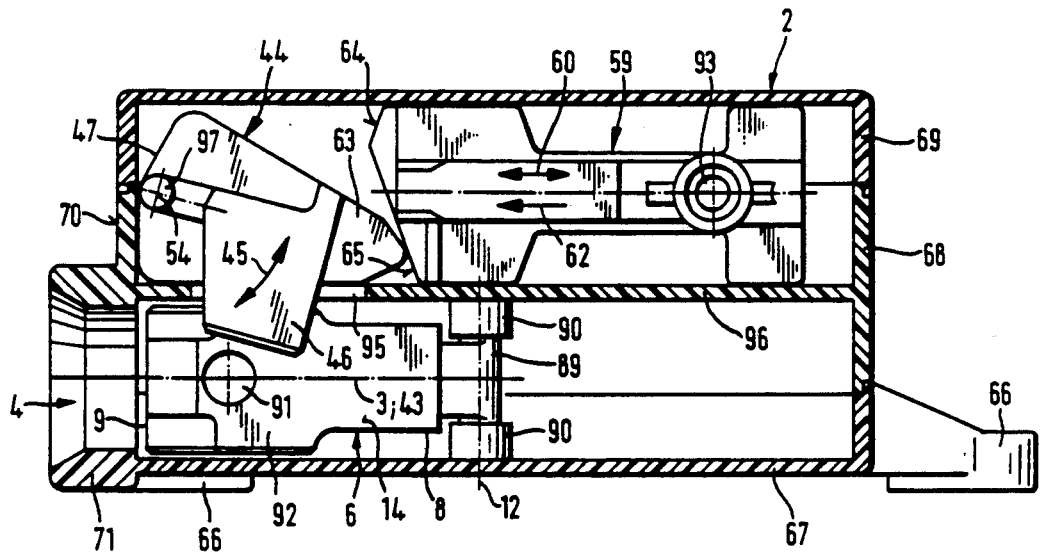
FIG. 10 is a sectional view seen along line X—X of FIG. 9.
Figure 11:
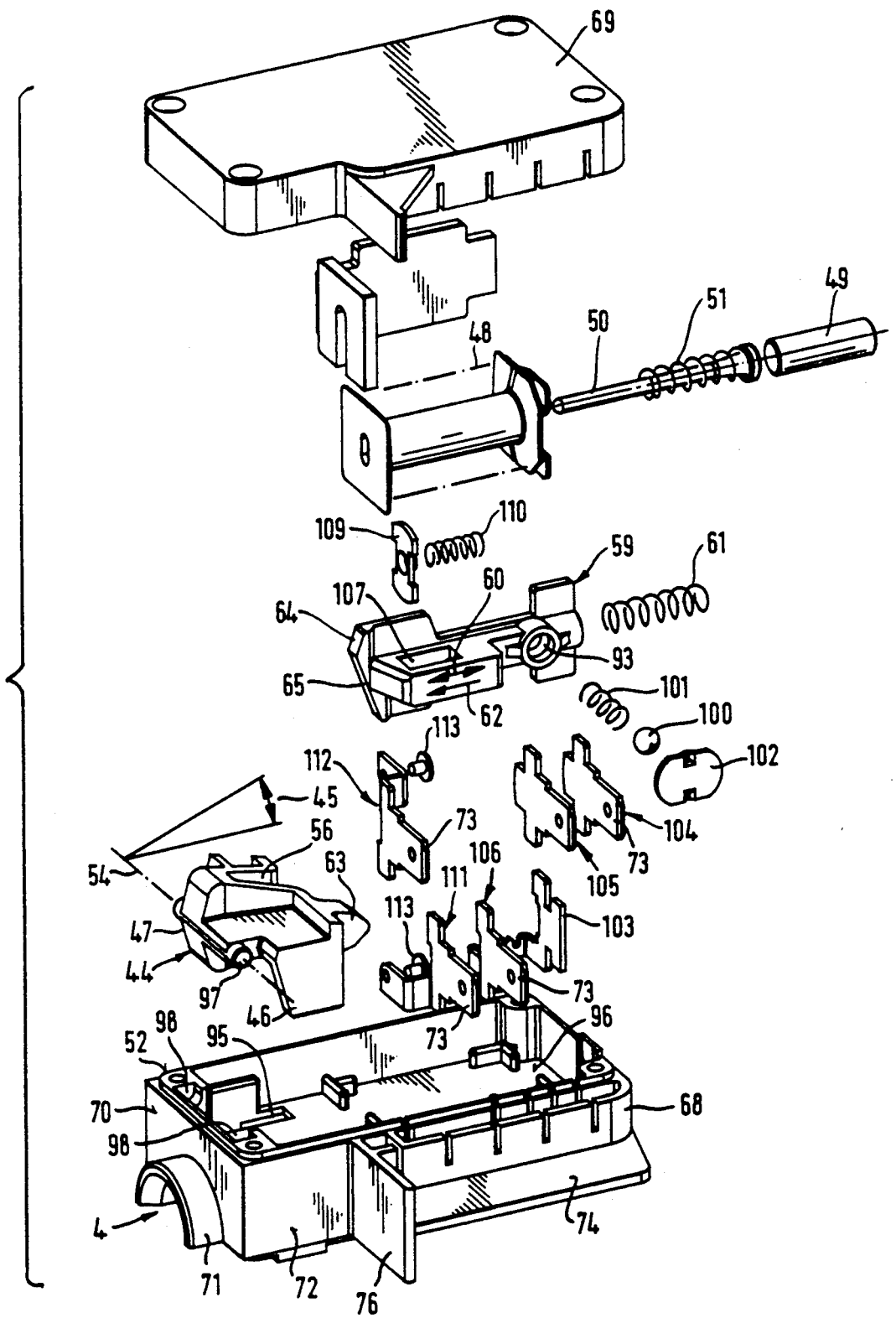
FIG. 11 is a perspective exploded view of the blocking device disposed between the center section and the covering shell.

FIGS. 7 and 8 show the inactive state of the pivoted-out blocking device. The pivotal member 44 is fixed in this inactive position by spring-charged locking slide 59. For this purpose, the control edge 64 of the locking slide 59 grips below the cam 63 and holds the pivotal member 44 in its inactive pivoted-out position.

Figure 12:
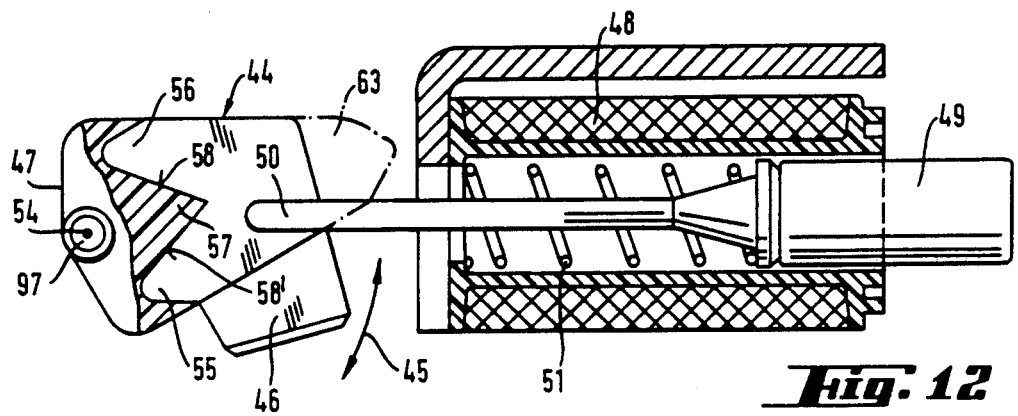
FIGS. 12 to 14 are schematic detail views of the step-by-step pivot drive for the blocking member of the blocking device.
Figure 13:
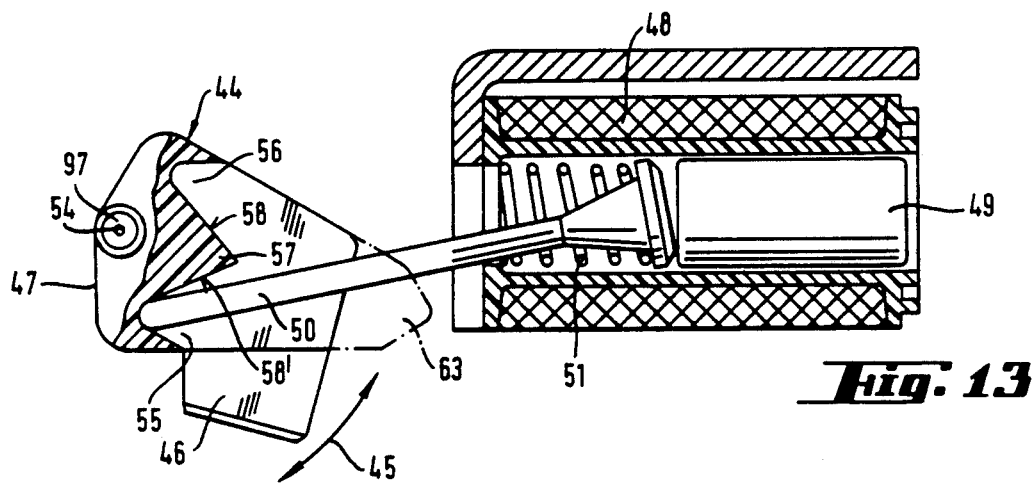
Figure 14:
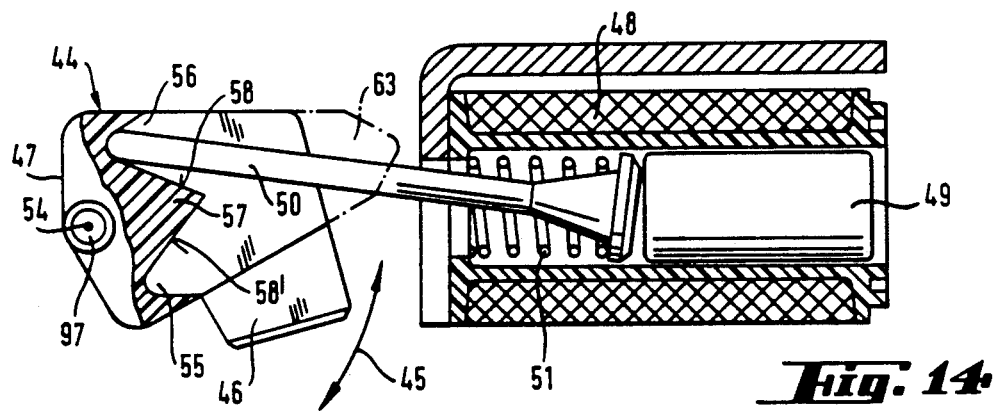

With appropriate programming of the appliance, the electrical switching process to activate the blocking device is initiated after closing of the door of the appliance and, for example, by switching on the pyrolysis process for the oven. This causes a voltage to be applied to the contact member 104. The circuit of the coil 48 is closed by way of the rocker switch 102, the tilt web 103, the coil windings and the contact member 106. The current sent by armature 49 through the coil 48 pushes the driving tappet 50, which so far has been in the rest position shown in FIG. 12, against the inner wedge face 58' of the web 57 and guides it to flip into the inner fillet 55, as shown in FIG. 13.

By charging the fillet 55 on the side of the switching slide 1, driving tappet 50 pivots the pivotal member 44 into its blocking position in which its tabs 46 pass through recesses 95 in the intermediate bottom 96 to there grip, in the manner of a clamp, around the exterior faces 14 of the latch levers 6 which are in their rest position in which the detent bolt 5 is fixed. The pivotal member 44, in turn, is fixed in its blocking position by the locking slide 59 in that the lower control edge 65 of the latter charges cam 63 in the pivoting-in direction and blocks it. By way of its control edges 64 and 65 which cooperate with cam 63, the locking slide 59 is coupled for movement with the pivotal member 44 and, during the pivoting-in movement of the pivotal member 44, is automatically shifted by the compression spring 61 from its starting position into its blocking position, namely in the fixing direction 62. This simultaneously causes the rocker switch 102 to be changed to the contact member 105 to which no voltage is applied. Consequently, the circuit through coil 48 is interrupted and reset spring 51 automatically mechanically pushes driving tappet 50 and armature 49 back into their starting position.

The blockage of the latch levers 6 can be released only when the program of the appliance switches a voltage to the terminal 105. This causes the driving tappet 50, driven by the armature 49, to advance again. The outer wedge face 58 of the web 57 guides the driving tappet 50 into the outer fillet 56. The charge on the outer fillet 56 causes the pivotal member 44 to be pivoted into its inactive, pivoted-out position and the state shown in FIGS. 7 and 8 is attained again in which the latch levers 6 of the door lock can be spread apart.

Due to the contact of the projecting outer control edge 64 of the locking slide 59 with cam 63 of the pivotal member 44 of the door lock and with the pivotal member 44 in the inactive pivoted-out position, the contact bridge 109, which is coupled for movement with the locking slide 59, is lifted away from the fixed contacts 113 of the contact members 111 and 112. In the active pivoted-in or blocking position of the pivotal member 44, however, the trailing inner control edge 65 of the locking slide 59 lies against the cam 63 of the pivotal member 44. This causes the locking slide 59 to project farther in the fixing direction 62 and the contact bridge 109, which is coupled for movement with the locking slide, bridges the fixed contacts 113 and consequently connects contact members 111 and 112 with one another. In this way, another circuit for monitoring the blocking position of the pivotal member can be controlled.

The detent adjustment device shown in FIGS. 15 to 17 serves to facilitate the adjustment work during installation of the door of the appliance. This adjustment work is necessary because the detent bolt 5 on the side of the door must penetrate only to a defined depth into the insulated housing 2 and must be able to move the switching slide 1 into a defined "on" position while, in addition, manufacturing tolerances must be compensated for. For this reason, the detent bolt on the door side is generally not fastened rigidly to the door of the appliance but by means of an adjustment mechanism which permits a change in the position of the detent bolt 5 in the door of the appliance.

For installation, the door of the appliance is installed first so that it is flush with the appliance. In a second step, the distance position of the detent bolt 5 relative to the appliance door is set with the aid of the adjustment mechanism so that the penetration depth of the detent bolt 5 in door lock housing 2, which is given by the switching path of the switching slide 1, is ensured and is not exceeded. The correct penetration depth is realized when detent rollers 116 engage in detent grooves 115 in the detent bolt 5. This engagement occurs within a sharply defined range of movement of the detent element of the door. It can be discerned by the installer by means of his sense of touch or hearing. In contrast to the detent adjustment device, the detent bolt 5 on the side of the door is not fixed abruptly by the latch levers 6 in the interior of the insulated housing 2 but on the basis of the cooperating wedge faces within a relatively large range of motion of the detent bolt 5 on the side of the door and is therefore difficult to discern in any case.

It will be understood that the above description of the present invention is susceptible to various modifications, changes and adaptations, and the same are intended to be comprehended within the meaning and range of equivalents of the appended claims.

What is claimed is:

1. A safety door lock for a door of an electrical appliance to selectively enable or disable operation of the electrical appliance, comprising:

a longitudinally displaceable detent bolt mounted in a door of an appliance, said detent bolt including a free end having a detent recess;

a door lock housing having an opening adapted for receiving said free end of said detent bolt;

a switching slide which is longitudinally displaceable along a longitudinal axis and which is mounted in the door lock housing, the switching slide being oriented such that longitudinal displacement of the detent bolt toward the switching slide brings the detent bolt into engagement with the switching slide, said switching slide having a stub end adapted to engage with the free end of the detent bolt; after engagement of the end of the detent bolt with the stub end of the switching slide, further longitudinal displacement of the detent bolt in a direction toward the switching slide causing movement of the switching slide in an "on" direction to its "on" position;

a biasing means for urging the switching slide in an "off" direction toward an "off" position in which the appliance is disabled;

a detent means for latching the free end of the detent bolt in a locking position within the door lock housing upon insertion of the detent bolt in the door lock housing and for locking the switching slide in its "off" position when the end of the detent bolt is not inserted in the door lock housing; the detent means including at least one releasable locking latch which clamps the stub end of the switching slide in the "on" position of the switching slide, to prevent longitudinal movement of the switching slide; said at least one locking latch being movable in a direction which is generally radial to the longitudinal axis; means for biasing the latch carriers toward the longitudinal axis;

said at least one locking latch having a first portion which, in the "on" position of the switching slide, engages the detent recess in the free end of the detent bolt to retain the detent bolt within the door lock housing, and having a second portion which, in the "off" position of the switching slide, engages the stub end of the switching slide to retain the switching slide against longitudinal movement toward the "on" position.

2. A door lock as defined in claim 1, wherein said at least one locking latch is a latch lever which is pivotably mounted at one end to the door lock housing.

3. A door lock as defined in claim 1, wherein the switching slide has a detent abutment face, and said second portion of said at least one locking latch acts as a catch against the detent abutment face of the switching slide in the "off" position of the switching slide.

4. A door lock as defined in claim 3, further comprising an electrically controllable blocking member which can be moved between an inactive position and a blocking position relative to the switching slide, and which, in the blocking position, blocks the movement of said at least one locking latch.

5. A door lock as defined in claim 2, wherein the detent means includes two latch levers provided at diametrically opposite sides of the switching slide and of the detent bolt.

6. A door lock as defined in claim 5, herein the latch levers extend parallel to the longitudinal axis and are pivotable, at their end remote from the housing opening and oriented in the "on" direction, about a pivot axis extending at a right angle to the longitudinal axis.

7. A door lock as defined in claim 6, wherein the latch levers are spring biased towards the detent bolt.

8. A door lock as defined in claim 7, wherein in the regions of their free ends, the latch levers are each charged by a compression spring which is clamped in between the door lock housing and the outer face of the respective latch lever.

9. A door lock as defined in claim 5, wherein the flank of the detent latch facing the housing opening is configured as a wedge face in such a manner that the detent bolt, when it is pushed in the "on" direction for locking, spreads the latch levers apart so that their locking latches which have been lifted out of their locking position release the movement of the switching slide in the "on" direction.

10. A door lock as defined in claim 9, wherein the detent latches have a wedge-shaped cross section and include a wedge face oriented in the "off" direction as well as a wedge face oriented in the "on" direction.

11. A door lock as defined in claim 5, wherein at its end to be introduced into the housing opening, the detent bolt has a radial projection which cooperates with the detent latches of the latch levers.

12. A door lock as defined in claim 11, wherein the radial projection is configured as a circumferential annular projection which has a cone face oriented in the "on" direction and whose control slope oriented in the "off" direction is also configured as a cone face.

13. A door lock as defined in claim 1, wherein radially inwardly oriented inner faces of the latch levers are configured as a groove extending trough-like in the direction of the longitudinal center axis and the latches project beyond the inner faces in the manner of semi-annular beads, with the longitudinal center axis approximately constituting the ring axis.

14. A door lock as defined in claim 1, wherein the end of the switching slide oriented in the "off" direction is configured as a stub which, in the open position in which the latch levers are in the detent position, is surrounded by the detent latches and two diametrically opposite radial webs project from the exterior face of the stub so as to project, with the latch levers in the detent position, into the separating groove remaining between their free ends.

15. A door lock as defined in claim 1, wherein the end face of the detent bolt has a recess for receiving the stub end of the switching slide.

16. A door lock as defined in claim 9, wherein the locking latches are disposed approximately in the center between the ends of the latch levers.

17. A door lock as defined in claim 16, wherein the locking latch has a sawtooth-shaped cross section, with its flank on the side of the housing opening being configured as an essentially radially oriented abutment face and its flank oriented in the "on" direction being configured as a wedge face.

18. A door lock as defined in claim 17, wherein the switching slide has a locking projection which cooperates with the locking latches and has a sawtooth-shaped cross section whose flank oriented in the "on" direction extends, as the abutment face, approximately parallel to the abutment face for the switching slide detent latches and whose flank oriented in the "off" direction is a wedge face which acts as a lift-off slope relative to the locking latches.

19. A door lock as defined in claim 4, wherein the blocking member is mounted in a side chamber of the insulated housing essentially at a right angle to the pivot plane of the latch levers so as to be pivotal between an active position in which it engages in the pivot plane of the latch levers and an inactive position in which it is moved out of the pivot plane of the latch levers.

20. A door lock as defined in claim 19, wherein the blocking member is a pivotal member which has tabs that are shaped on at two sides facing away from one another and project in the pivoting direction of the pivotal member in the manner of fork tines, with the tabs gripping around the outer faces of the latch levers in the manner of a clamp when in the blocking position.

21. A door lock as defined in claim 20, wherein in the blocking position, the tabs lie near the free ends of the latch levers.

22. A door lock as defined in claim 20, wherein the end of the pivotal member oriented in the "off" direction is mounted at the housing.

23. A door lock as defined in claim 1, wherein an electromagnetic driving device acting in the manner of a stepping mechanism for driving the pivotal member into its blocking position and into its pivoted-out position, the device including a coil, an armature and a driving tappet which is mounted so as to be movable parallel to the longitudinal center axis for driving the pivotal member and a driving tappet reset spring which acts parallel to the "on" direction.

24. A door lock as defined in claim 1, wherein the pivotal member has abutment faces disposed on both sides of its pivot axis so as to be alternatingly charged by the driving tappet.

25. A door lock as defined in claim 24, wherein the abutment faces are configured as fillets and are separated from one another by means of a wedge-shaped web whose wedge faces guide the driving tappet, which is configured as a tip tappet, into the appropriate fillet depending on the pivoted position of the pivotal member.

26. A door lock as defined in claim 1, further comprising a locking slide mounted so as to be longitudinally movable parallel to the "off" direction under the pressure of a spring element supported at the housing and lies against the pivotal member to thus mechanically fix it in its two pivoted function positions.

27. A door lock as defined in claim 26, wherein the displacement direction of the locking slide extends at a right angle to the pivot axis of the pivotal member and parallel to the pivot plane of the latch levers.

28. A door lock as defined in claim 26, wherein under the pressure of a compression spring, the locking slide lies against the cam of the pivotal member.

29. A door lock as defined in claim 28, wherein the end face of the locking slide which is oriented in the fixing direction and cooperates with the cam projects in a wedge-shaped manner and forms a projecting outer control edge as well as a far retracted inner control edge and, by way of these control edges, in that they are changed in position in the displacement direction, the pivotal member, on the one hand, controls the displacement movement of the locking slide; and
on the other hand, is fixed in its two pivoted positions in that the control edges alternatingly charge the cam at one of its sides with a pressure component acting in the direction of the respective end position.

30. A door lock as defined in claim 26, wherein the locking slide supports a switching device which disconnects the electromagnetic driving device for the driving tappet as soon as the pivotal member takes on its pivoted blocking position.

31. A door lock as defined in claim 26, wherein the locking slide, in turn, is configured as a switching slide so as to control at least one circuit.

32. A door lock as defined in claim 26, further comprising a spring biased catch disposed in the housing opening and a detent groove at the detent bolt cooperating with the catch in the manner of a pawl and ratchet assembly, with the detent groove being arranged in such a manner that the catch engages in it if the maximum penetration depth of the detent bolt in the insulated housing corresponds to the switching path required to move the switching slide into its "on" position.

33. A door lock as defined in claim 32, wherein two detent rollers having smaller diameter pivot pins shaped to their end faces are disposed as catches at opposite sides of the housing opening, extend parallel to one another and at a right angle to the longitudinal center axis of the switching slide, are movable at a right angle to the longitudinal center axis; and are spring biased in the detent direction.

34. A door lock as defined in claim 33, wherein the detent rollers are guided in guide channels of the insulated housing which extend at right angles to the longitudinal center axis, with their circumference and the end faces of their pivot pins lying against the inner walls of these guide channels and the one end of the guide channels opens into the housing opening and has an abutment for the pivot pins; and the other end is a blind end.

35. A door lock as defined in claim 34, further comprising a compression spring supported at the blind end of the guide channel and a detent roller supporting member disposed between the compression spring and the detent roller.

36. A door lock as defined in claim 35, wherein the supporting member is an essentially U-shaped bearing shackle guided in the guide channel and caused by the compression spring to lie with the end face ends of its arms against the circumferential faces of the pivot pins and press the pivot pins of the detent rollers against the abutments at the end of the guide channels opening into the housing opening.

37. A door lock as defined in claim 36, wherein the detent groove has a V-shaped cross section and is dimensioned in such a manner that the detent rollers engage therein to about one-half their cross-sectional area.

\* \* \* \* \*